United States Patent [19]
McElroy et al.

[11] Patent Number: 5,960,564
[45] Date of Patent: Oct. 5, 1999

[54] SIDE SHOT TWO CAR WASH DRYER

[75] Inventors: Timothy Patrick McElroy; Christopher Patrick McElroy, both of Glendale; Lucian G. McElroy, Carefree, all of Ariz.

[73] Assignee: Proto-Vest, Inc., Glendale, Ariz.

[21] Appl. No.: 09/032,069

[22] Filed: Feb. 27, 1998

[51] Int. Cl.⁶ .................................................. F26B 19/00
[52] U.S. Cl. ............................................ 34/666; 15/316.1
[58] Field of Search ........................... 34/210, 218, 222, 34/229, 230, 232, 666; 15/312.2, 316.1, 405

[56] References Cited

U.S. PATENT DOCUMENTS

| | | |
|---|---|---|
| 2,440,157 | 4/1948 | Rousseau . |
| 2,637,873 | 5/1953 | Berezny . |
| 3,045,929 | 7/1962 | McEachern . |
| 3,806,985 | 4/1974 | Takeuchi . |
| 3,808,703 | 5/1974 | Kamiya . |
| 4,689,749 | 8/1987 | Glogowski . |
| 4,893,229 | 1/1990 | Detrick . |
| 4,969,272 | 11/1990 | Schleeter et al. . |
| 5,177,950 | 1/1993 | Fowler, Jr. et al. . |
| 5,421,102 | 6/1995 | McElroy et al. ................ 34/666 X |
| 5,454,136 | 10/1995 | Gougoulas . |
| 5,553,346 | 9/1996 | McElroy . |
| 5,555,593 | 9/1996 | Decker ......................... 15/316.1 X |

*Primary Examiner*—Henry Bennett
*Assistant Examiner*—Steve Gravini
*Attorney, Agent, or Firm*—Howard & Howard

[57] ABSTRACT

An assembly for blowing liquids from a vehicle in a car wash which is characterized by the pair of first 24 and second 26 side bags extending from each of side supports 14, 16, 114 and 116 with each pair 24 and 26 of side bags being coextensive and extending vertically along the associated side support 14, 16, 114 or 116 and outwardly therefrom to elongated generally vertical nozzles 32. The first side bag 24 is disposed to direct the output flow therefrom along a first plane (A) directed forwardly twenty degrees (20°) and the second side bag 26 is disposed to direct the output flow therefrom along a second plane (B) directed rearwardly twenty degrees (20°).

8 Claims, 4 Drawing Sheets

SIDE SHOT TWO CAR WASH DRYER

BACKGROUND OF THE INVENTION

1. Field of the Invention

The invention relates to a fluid stripping apparatus for stripping fluid from an object, and more particularly towards an apparatus used in a car wash system for stripping rinse water from vehicles.

2. Description of the Prior Art

Conventional car wash systems include a drying station near the exit of the car wash line for drying rinse water from the surface of vehicles. The sides of each vehicle are dried by stationary blower units located on the sides of the car wash line which include one or more vertical nozzles. The top surface of the vehicle is dried by one or more overhead blower ducts. The overhead blower ducts are frequently hinged at one end to permit vertical movement, and normally include a roller-type follower at its free end for following the longitudinal contour of the vehicle.

A specific fluid stripping apparatus is disclosed in U.S. Pat. No. 4,161,801 issued Jul. 24, 1979 in the name of Day et al., and owned by the assignee of the subject invention. The patent discloses the use of flexible, inflatable bags of generally rectangular transverse cross-section having an inlet for introducing air under pressure into the bag and an elongated opening at the bag end defining a nozzle to admit the stream of air to a vehicle for drying purposes. The nozzle end of the bag lies in the path of motion of the object to cause physical engagement between the nozzle end of the bag and the object to bring the stream of air emitted from the nozzle opening into close space relationship with the surface of the object.

Another type of blower apparatus is set forth in U.S. Pat. No. 5,553,346 issued Sep. 10, 1996 in the name of McElroy, which discloses an array of bags disposed about a U-shaped plenum for blowing water of the roof and sides of a vehicle.

Although the prior art is effective, there remains room for improvement in the effectiveness of drying the sides of a vehicle.

SUMMARY OF THE INVENTION AND ADVANTAGES

An assembly for blowing liquids from the surface of a vehicle comprising a U-shaped support plenum for distributing air to various surfaces of the vehicle and a blower connected to the support plenum for producing the pressurized air. The support plenum includes two vertically extending side supports and is characterized by a pair of first and second side bags extending from each of the side supports with the pair of side bags being coextensive and extending vertically along the associated side support and outwardly therefrom to elongated generally vertical nozzles for issuing an output flow from each bag.

Accordingly, the subject invention provides an improved assembly for drying the sides of a vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
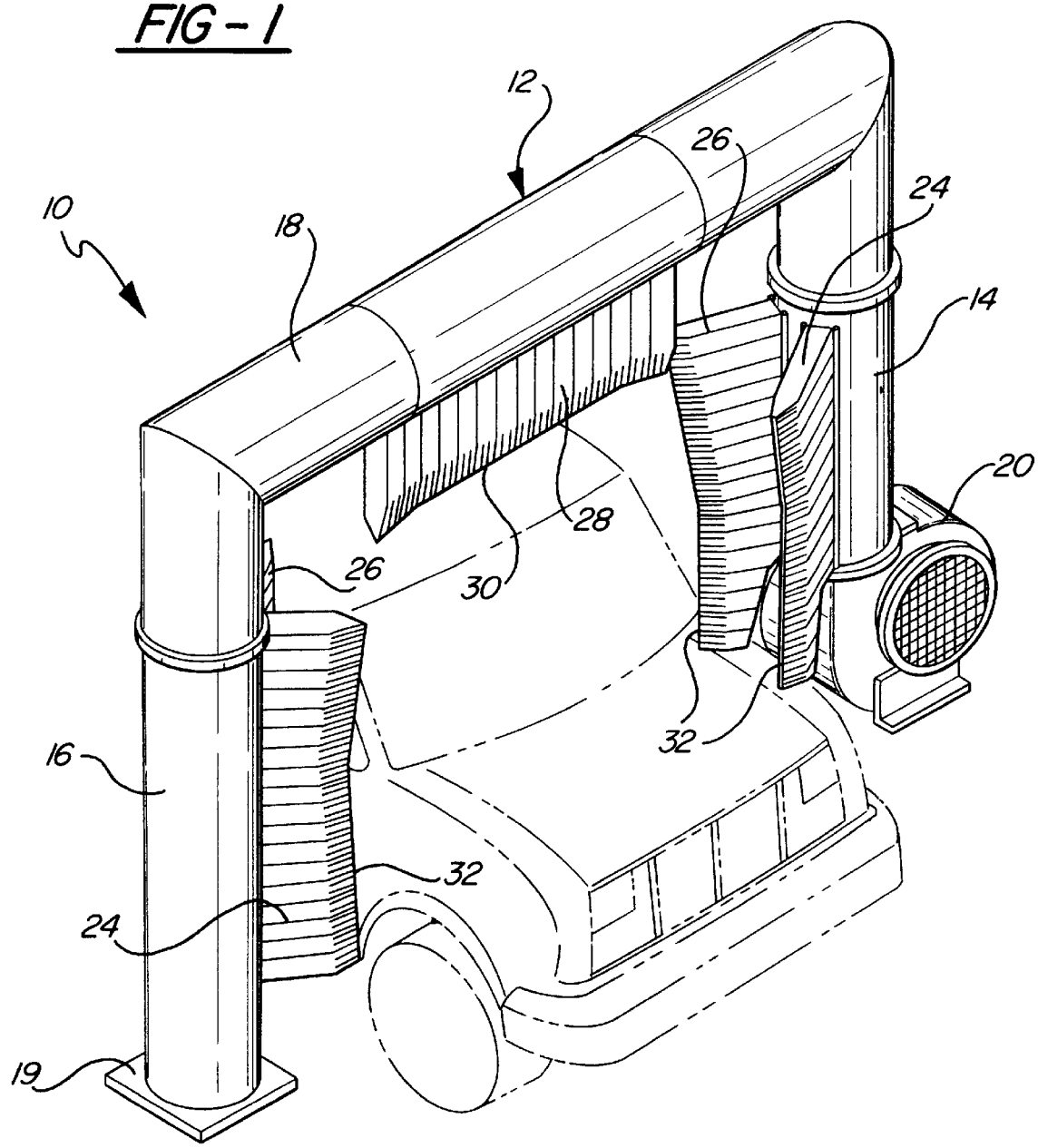
FIG. 1 is a perspective view of the subject invention.
Figure 2:
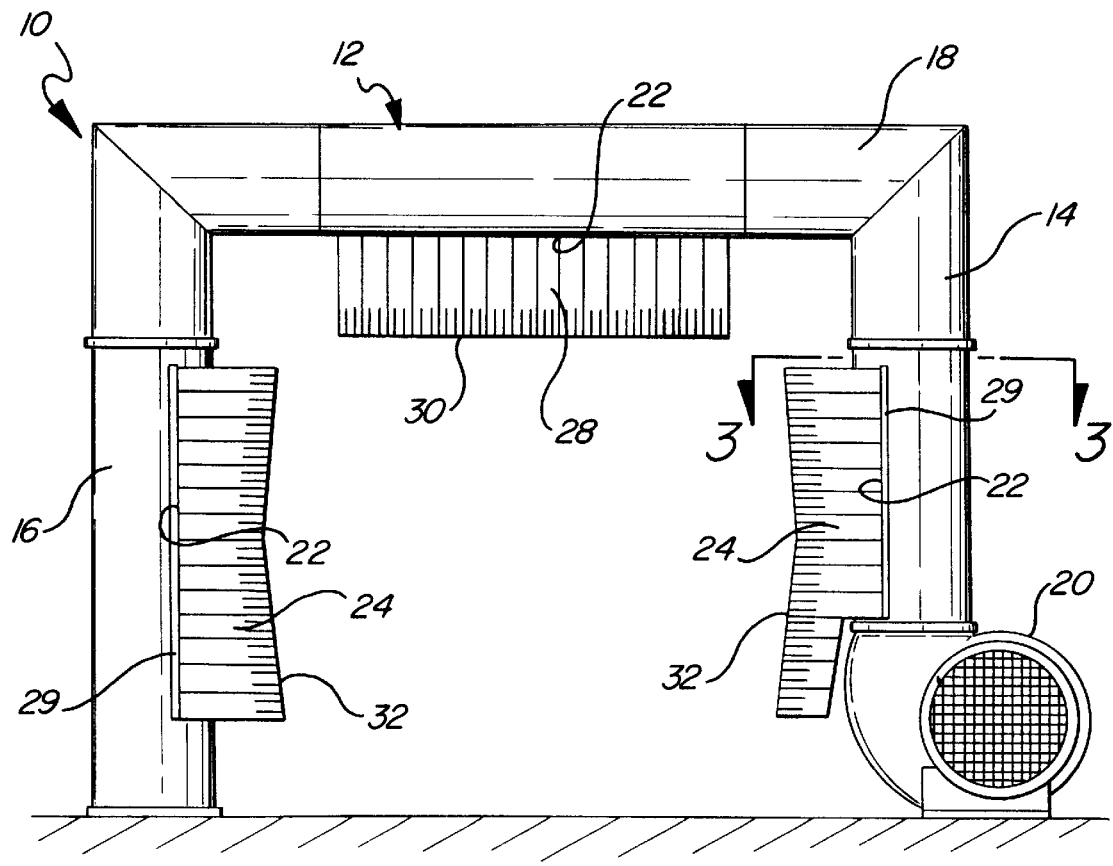
FIG. 2 is an elevational view of the subject invention.
Figure 3:
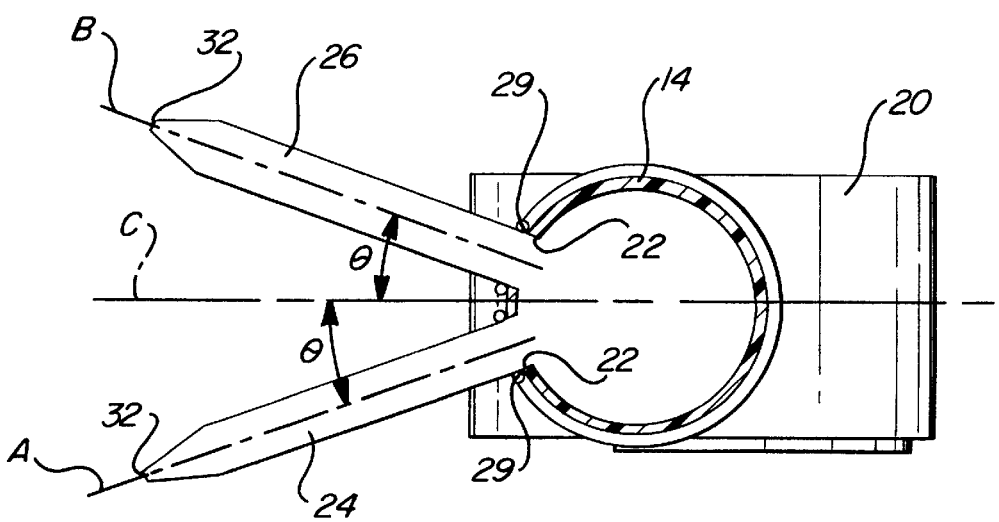
FIG. 3 is a cross sectional view taken along line 3—3 of FIG. 2.
Figure 4:
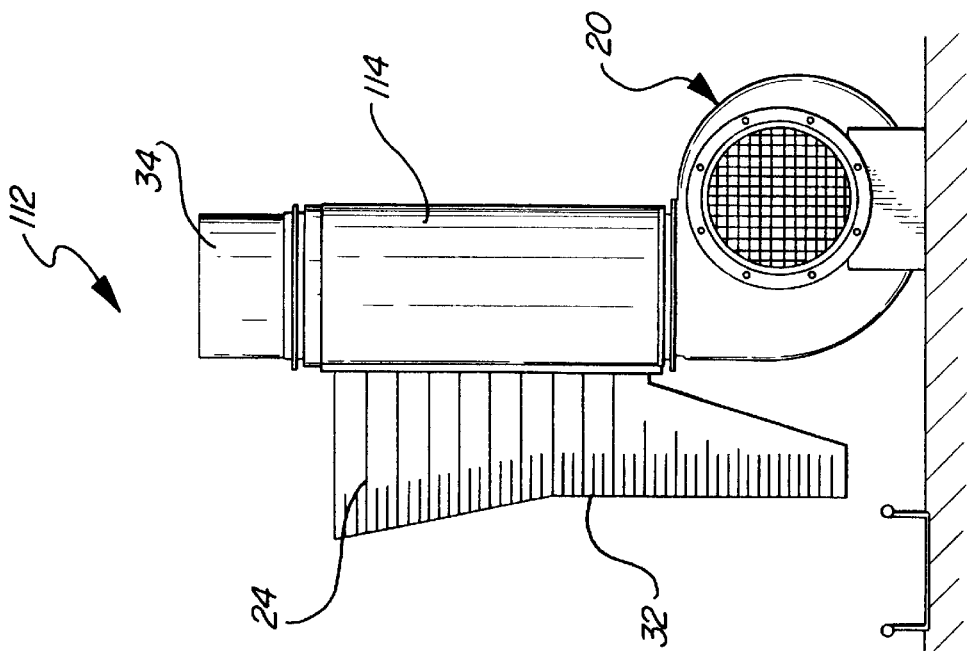
FIG. 4 is a front view of the subject invention.
Figure 4:
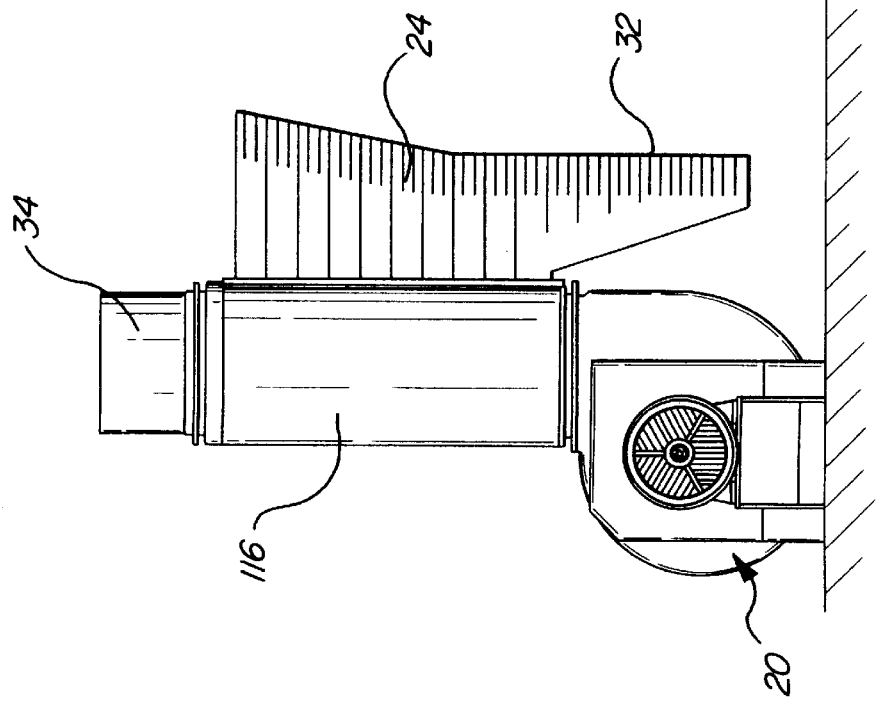
Figure 5:
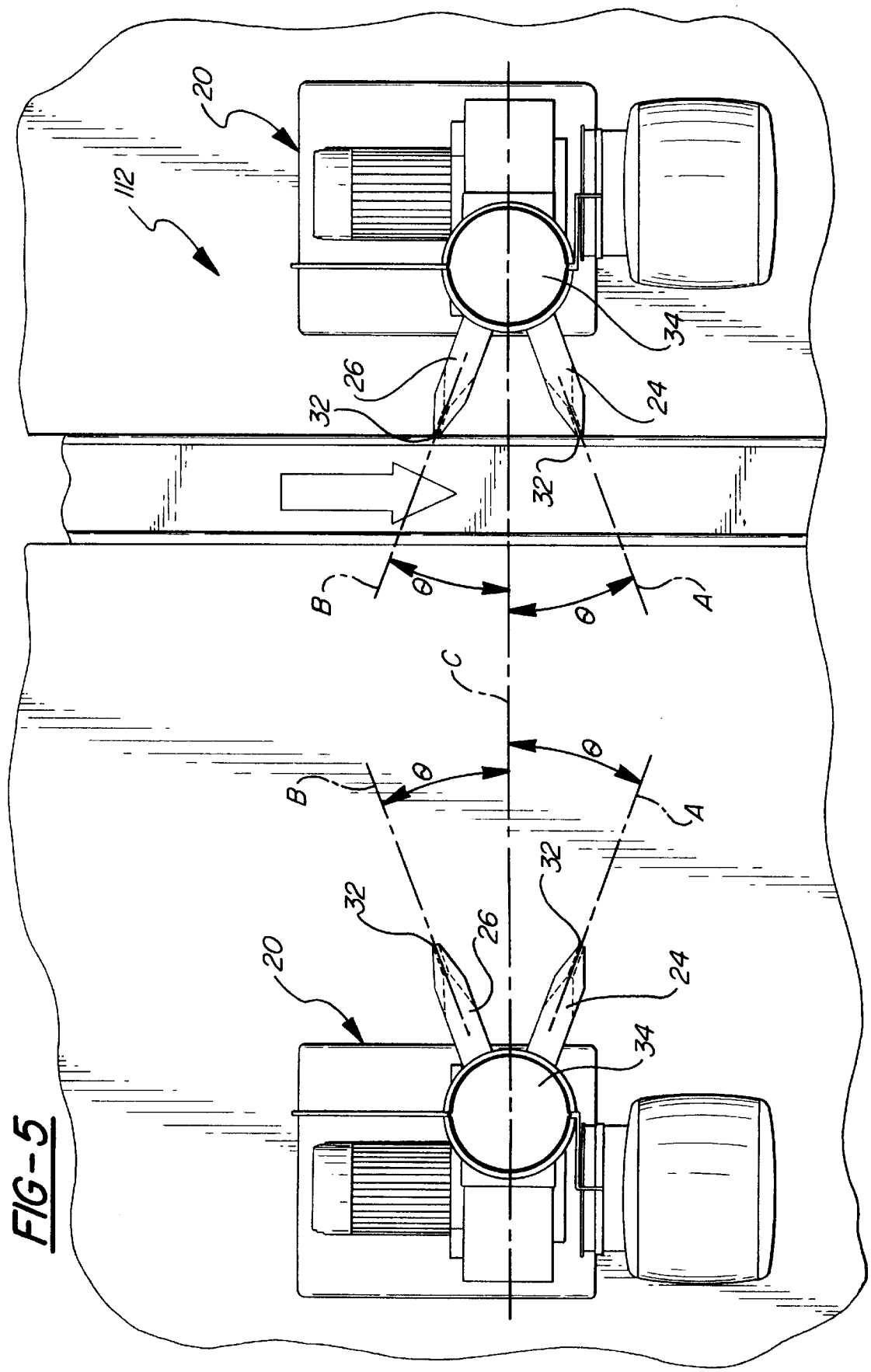
FIG. 5 is a top view of the subject invention.

An assembly for use at the drying station of a car wash system is generally shown at 10 in FIGS. 1 and 2 and at 112 in FIGS. 4 and 5. While the invention has broader application, it is described herein with reference to a car wash system since it is particularly applicable to such systems.

The apparatus 10 of FIGS. 1 and 2 includes a U-shaped support plenum, generally indicated at 12, for distributing air to various surfaces of the vehicle (shown in phantom in FIG. 1). The support plenum 12 includes first and second vertically extending side supports or air ducts 14, 16 with an overhead support or duct 18 extending horizontally between the side supports 14, 16. The side supports 14, 16 and overhead support 18 comprise air ducting of generally circular cross-section with the overhead support 18 connected perpendicular to the side supports 14, 16. The support plenum 12 may be supported on the floor of a building which contains the car wash system, e.g., by plats 19 under the side support 16.

A blower 20 is connected to the side support 14 of the support plenum 12 for producing the pressurized air. In the preferred embodiment, the blower 20 is a twenty-five horsepower blower with a load limit design. Such a blower 20 which has been found to be suitable is that by Buffalo Forge Company, which can produce 9,000–12,000 CFM at the general 25 HP. In the preferred embodiment, the blower 20 is connected to the base or lower portion of the second side support 14, which supplies the pressurized air continuously through the entire length of the support plenum 12, i.e., through first side support 14, the overhead support 18 and the second side support 16.

Each of the first and second side supports 14, 16 and overhead support 18 include longitudinal openings 22 to allow air to pass therethrough. Such openings 22 are generally rectangular, and substantially slotted.

The apparatus 10 includes a plurality of flexible air bags 24, 26 and 28 connected to the support plenum 12 for receiving the pressurized air from the blower and directing the pressurized air toward the object or vehicle. A first side bag 24 and the second side bag 26 are connected to each of the first and second side supports 14 and 16. An overhead bag 28 is connected to the overhead support 18. The air bags 24, 26 and 28 are connected to the supports 14, 16, 18 at the longitudinal openings 22 to receive the pressurized air at an upper or first end and extend vertically downward to a second or nozzle end. The connection of the bags 24, 26 and 28 to the support plenum 12 are commonly known in the art to allow sealing of the bags 24, 26 and 28 thereto. As shown, a clamp or frame 29 holds the open ends of the bags to the respective supports or ducts.

The bags 24, 26 and 28 are each generally rectangular in cross section transverse to their length between the connection to an outlet 22 of an air duct and an outlet nozzle 30. The upper or central bag 28 has a concave nozzle 30 directed away from the overhead support 18. This concave nozzle 30 is shaped generally to fit the curvature of the top of a vehicle to minimize the distance thereto. The side bags 24 and 26 have vertically extending nozzles 32 which have a shallow V-shape from end to end.

Due to the restriction at the nozzles 30 and 32 of the bags 24, 26 and 28, a bag pressure is created slightly greater than atmosphere pressure to keep the bags 24, 26 and 28 in an inflated condition. When inflated, the air pressure in the bags 24, 26 and 28 causes the bags to be somewhat stiff or rigid. Therefore, even though the bags 24, 26 and 28 are made of a flexible material, they are self-supporting when inflated. The bags 24, 26 and 28 are, however, sufficiently deformable under an applied force so that when engaged by a vehicle moving through the car wash, the bags 24, 26 and 28 may be pushed aside.

The embodiment of FIGS. 4 and 5 differs from the first embodiment by including only side supports 114 and 116 with each side support 114 and 116 have upper and lower ends. One of the blowers (20) is disposed at the lower end of each of the side supports 114 and 116 and a cap 34 is secured to the upper end of each of the side supports 114 and 116. Each cap 34 is spaced vertically above the upper extremities of the side bags 24 and 26 to produce a cushion air chamber in the upper end of each of the side supports 114 and 116.

The blowers are well known in the art and comprise a fan and an electric motor to rotate the fan.

In any embodiment, the assembly is characterized by the pair of first 24 and second 26 side bags extending from each of the side supports 14, 16, 114 and 116 with each pair 24 and 26 of side bags being coextensive and extending vertically along the associated side support 14, 16, 114 or 116 and outwardly therefrom to elongated generally vertical nozzles 32 for issuing an output flow from each bag. The first side bag 24 is disposed to direct the output flow therefrom forwardly along a first plane (A) and the second side bag 26 is disposed to direct the output flow therefrom rearwardly along a second plane (B) which diverges from the first plane (A). The side supports 14 and 16 define a central plane (C) and the first plane (A) of the first side bag 24 extends at an acute angle theta (θ) to and on a first or forward side of the central plane (C) and the second plane (B) extends at the same or equal acute angle theta (θ) to and on the second or rearward side of the central plane (C). In the preferred embodiment, the acute angles (θ) equal twenty degrees (20°).

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. An assembly for blowing liquids from the surface of a vehicle, said apparatus comprising:

a support plenum (12, 112) for distributing air to various surfaces of the vehicle, said support plenum (12, 112) including two vertically extending side supports (14, 16, 114 and 116), at least one blower (20) connected to said support plenum (12, 112) for producing pressurized air, and characterized by a pair of first (24) and second (26) side bags extending from each of said side supports (14, 16, 114 and 116), said pair of side bags (24 and 26) being coextensive and extending vertically along said associated side support and outwardly therefrom to elongated generally vertical nozzles (32) for issuing an output flow from each bag (24 and 26).

2. An assembly as set forth in claim 1 wherein said first side bag (24) is disposed to direct the output flow therefrom along a first plane (A) and said second side bag (26) is disposed to direct the output flow therefrom along a second plane (B) which diverges from said first plane (A).

3. An assembly as set forth in claim 2 wherein said overhead support (18) and said side supports (14, 16, 114 and 116) define a central plane (C), said first plane (A) extends at an acute angle (θ) to and on a first side of said central plane (C) and said second plane (B) extends at an acute angel (θ) to and on the second side of said central plane (C).

4. An assembly as set forth in claim 3 wherein said acute angles (θ) are equal.

5. An assembly as set forth in claim 4 wherein said acute angles (θ) equal twenty degrees.

6. An assembly as set forth in claim 3 wherein each of said side supports (114 and 116) include upper and lower ends with one of said blowers (20) at said lower end of each of said side supports (114 and 116) and a cap (34) at said upper end of each of said side supports (114 and 116).

7. An assembly as set forth in claim 6 wherein said cap (34) is spaced vertically above the upper extremities of said side bags (24 and 26) to produce a cushion air chamber in the upper end of each of said side supports (114 and 116).

8. An assembly as set forth in claim 3 wherein said support plenum (12) is U-shaped and includes two vertically extending side supports (14 and 16) and an overhead support (18) extending between said side supports (14 and 16), and including an overhead bag (28) extending from said overhead support (18) to an overhead nozzle (30).

* * * * *